Patented Nov. 4, 1930

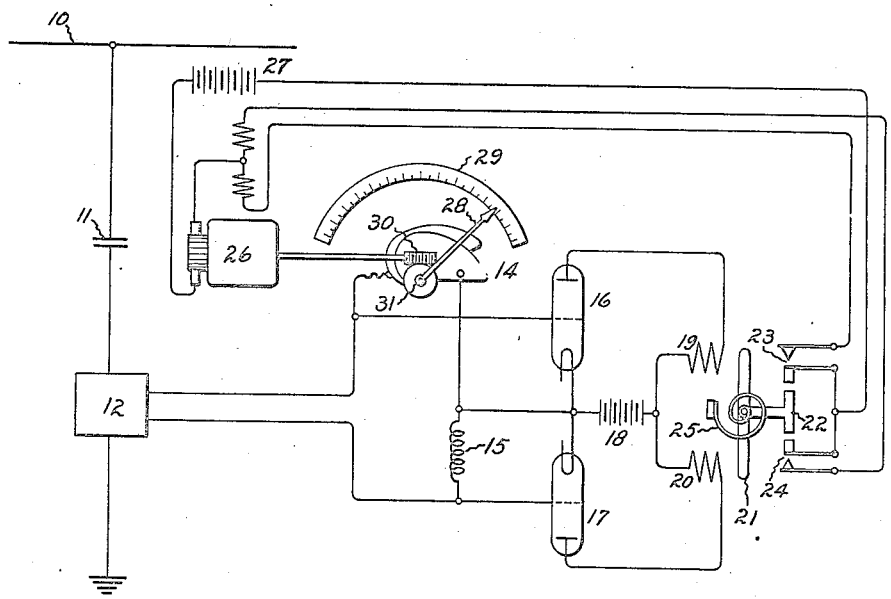

1,780,669

UNITED STATES PATENT OFFICE

WALDEMAR BRÜCKEL AND ROBERT SCHIMPF, OF BERLIN, GERMANY, ASSIGNORS TO GENERAL ELECTRIC COMPANY, A CORPORATION OF NEW YORK

FREQUENCY-RESPONSIVE SIGNAL-RECEIVING APPARATUS

Application filed April 23, 1925, Serial No. 25,451, and in Germany August 5, 1924.

Our invention relates to a frequency responsive signal receiving apparatus suitable for operating relays or for reproducing telemetric indications.

It is sometimes desirable to transmit the indications of measuring instruments to a distant point and reproduce the indications at such points. This is of special importance in the joint operation of a number of electric power stations supplying a common distribution system where the system is supervised from one control station. It may also be desirable to provide automatic load control with the same apparatus. Where the power stations are considerable distances apart, the expense of separate control wires between them becomes an important consideration and in such cases it may be preferable to make use of the existing power lines or one phase of an existing power line and a ground return.

It is known that high frequency currents, commonly called carrier currents, may be imposed upon a commercial frequency or a direct current power circuit without interference for the purpose of sending signals, the signal receiving apparatus being responsive only to the high frequency carrier current. The receiving apparatus which forms the subject of our invention is particularly designed for this kind of service.

According to our invention, the receiving apparatus includes an oscillation circuit having inductance and capacity connected in series with the high frequency signalling circuit the signalling currents of which are suitably amplified where that is necessary.

It is known that where inductance and capacity are connected in series with a variable frequency voltage, the relative voltage drop across the inductance and the capacity varies as the frequency is varied above or below the resonance frequency for which the circuit is tuned. We make use of this phenomenon to control a differential relay the differential coils of which are respectively connected so as to have currents proportional to the voltage drop across the two parts of the receiving circuit. The operation of this relay may therefore be made responsive to changes in the signalling frequency for a given resonance condition of the receiving circuit. Where the apparatus is to function as a telemetric receiving and indicating device, either the inductance or the capacity is made adjustable for the purpose of changing the resonance setting of the circuit. The differential relay is then made to control the position of the indicator for changes in frequency and simultaneously to tune the receiving circuit to a condition of resonance after each change in the signalling frequency.

The features of our invention which are believed to be novel and patentable will be pointed out in the claims appended hereto. For a better understanding of our invention, reference is made in the following description to the accompanying drawing which illustrates the preferred arrangement of our improved receiving device as used as a telemetric receiver.

Referring to the drawing, 10 indicates a conductor which may be one phase of a polyphase distribution system extending to a distant station. Between this conductor and ground is connected a circuit containing a condenser 11 and a high frequency receiving amplifier 12. It will be understood that high frequency carrier currents are transmitted through this circuit and that the frequency is varied in any suitable manner in accordance with the signals to be transmitted.

The present invention has to do with the receiving apparatus only and consequently the transmitting apparatus will not be described. In general the transmitter may be similar in operation to the receiver. A description of a suitable transmitting device for this purpose may be found in a copending application, Serial No. 721,341, filed June 20, 1924, of B. W. St. Clair, now Patent No. 1,718,497, issued June 25, 1929, entitled "Telemetric system", which application is assigned to the same assignee as the present invention. The amplified receiving circuit shown at 12 contains a condenser 14 and a reactance 15 connected in series. The condenser 14 is here represented as being adjustable; however it will be evident that the inductive reactance might be the adjustable element of the circuit instead of the condenser and in certain cases the circuit need not be made adjustable.

Connected across the condenser 14 is the grid and cathode circuit of a tube 16 connected as a rectifier, and similarly connected across the reactance 15 is the grid and cathode circuit of a tube 17. The cathodes of the tubes are connected to the negative pole of a battery 18. Between the other pole of this battery and the plates of the tubes 16 and 17 are separately connected the coils 19 and 20 of a differential relay, the pivotally mounted armature of which is represented at 21.

The relay armature is provided with a contact closing lever 22 cooperating with circuit closing contacts 23 and 24, which contacts are biased to an open position when the relay armature is in a central position. The armature 21 is normally biased to the central position represented by a spring 25. Coil 19 tends to turn the armature and its lever in a counter clockwise direction and coil 20 tends to turn the armature in the opposite direction. When these two coils are deenergized or are equally energized, the armature stands in the central position represented.

The receiving circuit is so proportioned that it may be tuned to a condition of resonance by the adjustable condenser 14 for any frequency of the received signalling current within the range of signalling frequency selected. When so tuned, the voltage drops across the condenser 14 and inductive reactance 15 are equal or substantially equal and as a consequence, the plate currents of the two tubes 16 and 17 are equal. When the signalling frequency is increased above the resonance frequency of the receiving circuit for a given setting of the condenser 14, the voltage drop across the inductive reactance 15 will be higher than that across the condenser and as a consequence, the current in the plate circuit of tube 17 will be higher than that in the corresponding circuit of tube 16. Coil 20 will then predominate over coil 19 and rotate the armature 21 in a clockwise direction closing contacts 24. If the frequency is decreased below that corresponding to a condition of resonance, the voltage across the condenser 14 will be higher than that across the inductive reactance and as a result coil 19 will predominate over coil 20 to rotate armature 21 in a counter clockwise direction to close contacts 23. It will be evident that if the apparatus is merely used to operate the relay, it will not be necessary to adjust the resonance setting of the receiving circuit. However if used as a telemetric receiving apparatus the resonance setting of the receiving current will be changed as the signalling frequency is changed in response to some remote indicating device and simultaneously there will be operated a receiving indicator calibrated with the apparatus to reproduce the distant indication.

For this purpose the contacts 23 and 24 control the energizing circuit of a reversible motor 26 supplied from a suitable source 27. The plates of the condenser 14 are relatively adjusted by this motor, and simultaneously with this adjustment a pointer 28 is moved relative to a scale 29. One plate of the condenser may be made stationary and the other movable by means of a worm gear 30 driven by the motor 26. This worm gear drives a shaft 31 to which the pointer 28 and the movable part of the condenser is secured. The condenser plates may be so shaped as to obtain an exact or proportional deflection between the sending and receiving indicators and the scale 29 graduated accordingly. The motor 26 might be used to operate any other type of indicator or signal or a load control device, either separately or simultaneously with the indicator here represented.

With the apparatus thus arranged, it will be seen that when the signalling frequency corresponds to the resonance setting of the receiving circuit, contacts 23 and 24 will remain open and the indicator 28 stationary, giving an indication corresponding to the received frequency. If now, the received frequency is lowered, contacts 23 will be closed, which will start the motor 26 in a direction to adjust the receiving circuit to a condition of resonance with the new frequency. For the condition assumed, the capacity of the condenser should be increased and with the arrangement illustrated, the pointer 28 will then be moved to the right. As soon as the resonance condition is reached, contacts 23 are opened and the motor stopped. An increase in signalling frequency will cause the motor 26 to be operated in the opposite direction, moving the pointer 28 to the left, until a resonance condition is again established. The apparatus is thus caused to reproduce an indication corresponding to the transmitted frequency. Usual arrangements for obtaining sharpness in tuning and fine adjustments may be employed.

In accordance with the provisions of the patent statutes, we have described the principle of operation of our invention, together with the apparatus which we now consider to represent the best embodiment thereof; but we desire to have it understood that the apparatus shown and described is only illustrative and that the invention may be carried out by other means.

What we claim as new and desire to secure by Letters Patent of the United States is:—

1. A frequency responsive signal receiving apparatus comprising a signal receiving circuit having an inductive reactance and a capacitive reactance connected in series, a relay having a pair of differentially connected coils, means responsive to the voltage across the capacitive reactance for energizing one of said coils, means responsive to the voltage across the inductive reactance for energizing the other coil, and means including said relay for controlling one of said reactances in accordance with the frequency of the received current.

2. Frequency responsive signal receiving apparatus comprising a signal receiving circuit having an inductive reactance and a capacitive reactance connected in series, a pair of thermionic tubes having filament grid and plate electrodes, a circuit connecting the filament and grid of one tube across the capacitive reactance, a circuit connecting the filament and grid of the other tube across the inductive reactance, a relay having a pair of differentially wound coils respectively connected in the plate circuits of said tube, and means including said relay for controlling one of said reactances in accordance with the frequency of the received current.

3. A frequency responsive signal receiving apparatus comprising a signal receiving circuit, an inductive reactance and a capacity connected in series in said circuit, a relay responsive to the difference in the voltage drops across said inductive reactance and capacity, and means controlled by said relay for varying the relative values of said inductive reactance and capacity to maintain a condition of resonance at the frequency of the received signal current.

4. Frequency responsive signal receiving apparatus comprising a signal receiving circuit having an inductive reactance and a capacity connected in series, a relay having a pair of differentially connected coils, means responsive to the voltage across the capacity for energizing one of said coils, means responsive to the voltage across the inductive reactance for energizing the other of said coils, and means controlled by said relay for varying the relative values of said inductive reactance and capacity.

5. Frequency responsive signal receiving apparatus comprising a signal receiving circuit, an inductive reactance and a capacity connected in series in said circuit, a relay having a pair of differentially connected coils, a pair of thermionic tubes connected to energize said coils in response to the voltages across said inductive reactance and capacity respectively, and means controlled by said relay for varying the relative values of said inductive reactance and capacity.

6. Frequency responsive signal receiving apparatus comprising a signal receiving circuit containing an inductive reactance and a capacity connected in series, means for adjusting the relative values of said inductive reactance and capacity for tuning said circuit, a relay responsive to the difference in the voltages across said inductive reactance and capacity for controlling said tuning means to establish a condition of resonance upon a change in the frequency of the signalling current, and a position indicator moved by said tuning means.

7. Frequency responsive signal receiving apparatus comprising a signal receiving circuit containing tuning means, a motor for operating said tuning means, a position indicator operated by said motor, and a relay responsive to an untuned condition of said signal receiving circuit, as regards the frequency of the signalling current, for controlling said motor in a manner to tune said circuit to a condition of resonance.

8. Frequency responsive signal receiving apparatus comprising a signal receiving circuit containing an inductive reactance and a variable condenser connected in series, a reversible electric motor for adjusting the setting of said condenser, contacts for energizing said motor in either direction, a relay controlling said contacts, said relay having coils which are energized differentially in response to the voltages across said condenser and inductive reactance to maintain said contacts open when said circuit is in a condition of resonance, and to close said contacts in the proper direction to bring said circuit back to a condition of resonance whenever the frequency of the signalling current changes.

In witness whereof, we have hereunto set our hands this 4th day of April, 1925.

WALDEMAR BRÜCKEL.
DR. ROBERT SCHIMPF.